United States Patent
Kubica et al.

(10) Patent No.: US 6,526,338 B2
(45) Date of Patent: Feb. 25, 2003

(54) ELECTRICAL FLY-BY-WIRE SYSTEM FOR OPERATING AN AIRCRAFT RUDDER

(75) Inventors: François Kubica, Toulouse (FR); Daniel Cazy, Pibrac (FR); Sylvie Marquier, Toulouse (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 09/863,884

(22) Filed: May 24, 2001

(65) Prior Publication Data
US 2002/0022910 A1 Feb. 21, 2002

(30) Foreign Application Priority Data
May 29, 2000 (FR) .............................. 00 06829

(51) Int. Cl.⁷ .............................. B64C 13/50
(52) U.S. Cl. .............. 701/4; 701/3; 244/175; 244/221; 244/228; 244/235; 318/584; 318/585; 318/586
(58) Field of Search .............. 701/3, 4; 244/221, 244/228, 235, 175; 318/584, 585, 586

(56) References Cited

U.S. PATENT DOCUMENTS

| | | | |
|---|---|---|---|
| 3,033,496 A | | 5/1962 | Brands |
| 4,759,515 A | * | 7/1988 | Carl .............................. 244/221 |
| 5,025,199 A | * | 6/1991 | Ako ........................ 137/625.69 |
| 5,170,969 A | | 12/1992 | Lin |
| 5,375,794 A | * | 12/1994 | Bleeg .......................... 244/195 |
| 5,528,119 A | * | 6/1996 | Rundqwist et al. ......... 244/182 |
| 5,669,582 A | * | 9/1997 | Bryant et al. ............... 244/184 |

* cited by examiner

*Primary Examiner*—Michael J. Zanelli
*Assistant Examiner*—Eric M Gibson
(74) *Attorney, Agent, or Firm*—Stevens, Davis, Miller & Mosher, LLP

(57) ABSTRACT

An electrical fly-by-wire system for operating an aircraft rudder includes a low-pass filter, arranged between a rudder bar and an actuator of a rudder. The low-pass filter receives a control command from the rudder bar corresponding to the degree of travel the rudder bar has experienced from a neutral position. Based on the amplitude of the control command, the filter generates an operating command for the actuator. Additionally, the filter operates such that the higher the fraction of the rudder bar's travel away from the neutral position, with respect to its maximum value of travel, the higher the filter's time constant is set.

11 Claims, 2 Drawing Sheets

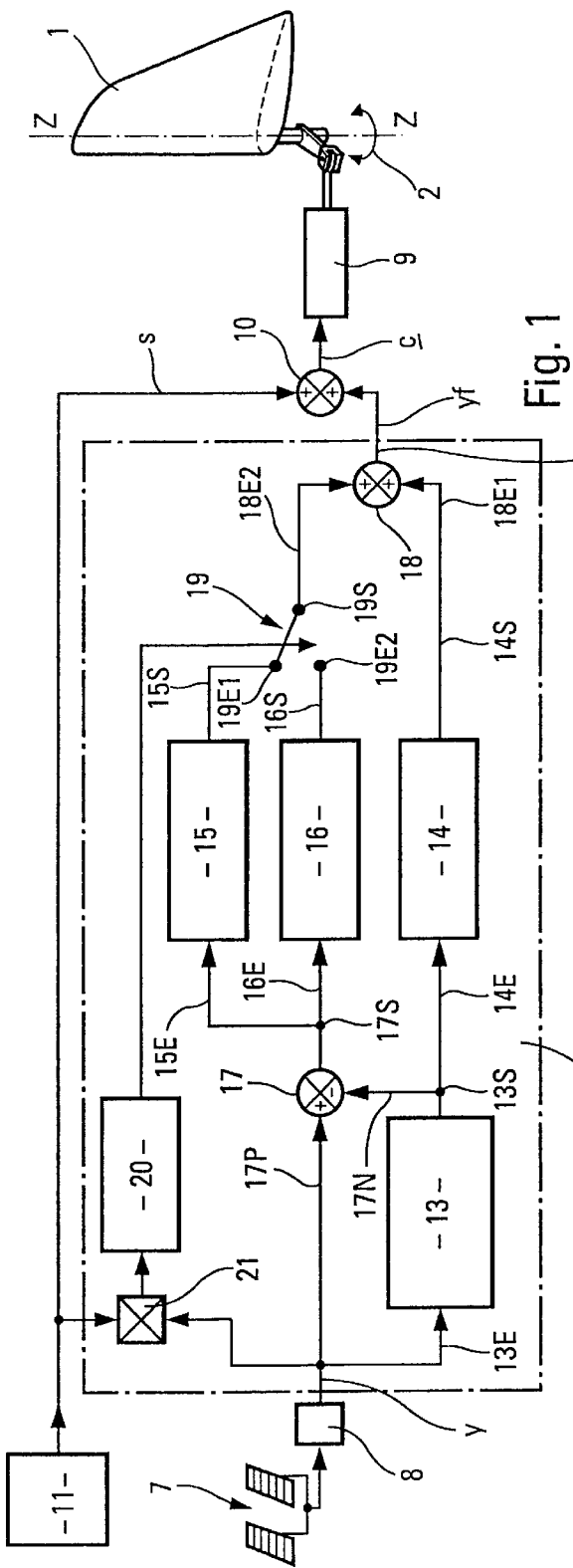
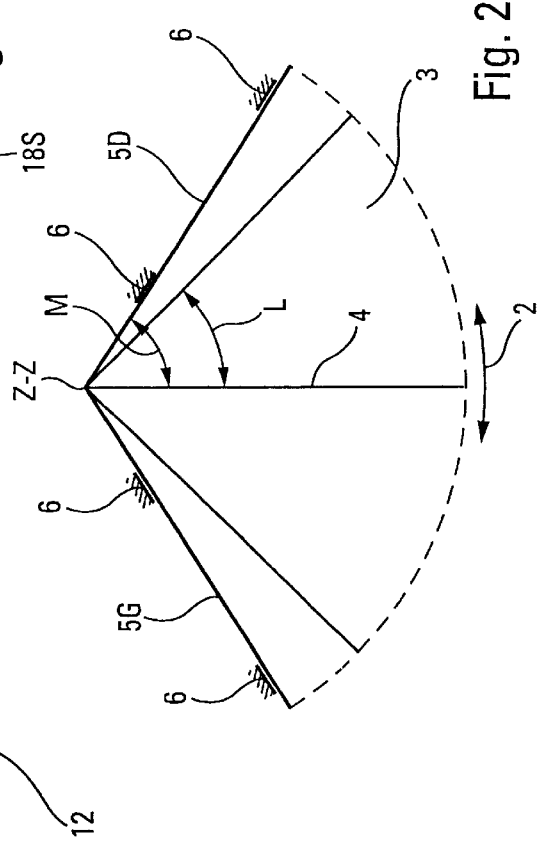

ELECTRICAL FLY-BY-WIRE SYSTEM FOR OPERATING AN AIRCRAFT RUDDER

FIELD OF THE INVENTION

The present invention relates to an electrical fly-by-wire system for operating an aircraft rudder.

BACKGROUND OF THE INVENTION

It is known that, at the present time, in most aircraft, a rudder is operated via a mechanical link positioned between the rudder bar, actuated by the pilot, and the rudder. However, electrical fly-by-wire operation of such a rudder has already been envisaged, in the image of what is already done with the other control surfaces, the flaps, ailerons, spoilers, etc.

Furthermore, it is known that such a rudder is engineered on the basis of calculated loadings applied to the aircraft during standardized maneuvers. In roll and yaw, these maneuvers consist in influencing the rudder by sharp actions on the rudder bar, up to the point where the rudder has reached its full travel.

SUMMARY OF THE INVENTION

A subject of the present invention is an electrical fly-by-wire system for operating a rudder, by virtue of which it is possible to limit the lateral loadings applied during maneuvers to the rudder and therefore reduce the size and mass thereof, without thereby reducing the flyability of the aircraft or flight safety.

To this end, according to the invention, the electrical fly-by-wire system for operating an aircraft rudder, the rudder being mounted so that it can rotate about an axis so that it can adopt any angular position whatsoever within a range of travel extending on each side of the neutral position of the rudder and limited on each side of this neutral position by a maximum travel value, and the system including:

- a rudder bar actuated by the pilot and associated with a transducer that delivers an electrical control command that represents the action of the pilot on the rudder bar; and
- an actuator receiving an operating command derived from the control command and moving the rudder about the axis.

The system is notable in that:
- between the rudder bar and the actuator there are filters of the low-pass type receiving the control command from the transducer and generating the operating command for the actuator; and
- the higher the fraction of the maximum travel value to which the amplitude of the control command corresponds, the higher the time constant of the filter.

Thus, by virtue of the present invention, non-linear filtering which depends on the travel available to the rudder is introduced into the control commands at the rudder bar, this filtering being all the greater the nearer the rudder gets to the end stops delimiting maximum travel, thus limiting the loadings applied to the rudder and therefore making it possible for its size and mass to be reduced.

Furthermore, it is known that it is customary for an operating system of the type recalled hereinabove to include, in addition, a yaw-stabilizer that generates a stabilizing command which is added to the control command at the rudder bar. In this case, the level of the maximum loadings on the rudder becomes particularly critical when these commands are of the same sign.

Hence, according to another particular feature of the present invention, the operating system additionally includes a yaw-stabilizer that stabilizes the aircraft in terms of yaw, generating a yaw-stabilizing command, and a first adder that sums the yaw-stabilizing command and the actuator operating command. Also, a sign identifier is provided, which is capable of determining whether the control command and the yaw-stabilizing command are of the same sign or of opposite signs. The sign identifier acts on the filters to increase their time constant when the control command and the stabilizing command are of the same sign.

Thus, the loadings applied to the rudder are reduced even more by further filtering of the control command at the rudder bar when the rudder is close to its position of maximum travel and when this command and the yaw-stabilizing command are of the same sign.

In a practical embodiment, the system according to the present invention includes:

- a limiter receiving the control command and delivering an output signal which is:
  - either the control command, when the amplitude thereof corresponds to a travel value below a limit equal to a predetermined fraction of the maximum travel value;
  - or a limit value corresponding to the limit when the amplitude of the control command is greater than this limit value;
- a first low-pass filter having a first time constant and receiving the output signal from the limiter;
- a subtractor calculating the difference between the control command and the output signal from the limiter;
- a second low-pass filter having a second time constant higher than the first time constant and receiving the difference calculated by the subtractor; and
- a second adder summing the output signals from the first and second filters, so as to generate a filtered control command for the actuator.

When this system is provided with the aforementioned yaw-stabilizer, it may additionally include:

- a third low-pass filter having a third time constant higher than the second time constant and receiving the difference calculated by the subtractor;
- a controlled switch inserted between the second and third low-pass filters, on the one hand, and the second adder, on the other hand, so as to be able to send to the second adder, either the output signal from the second low-pass filter or the output signal from the third low-pass filter; and
- a switch controller that:
  - connects the second low-pass filter to the second adder when the yaw-stabilizing command and the electrical control command are of opposite signs; or
  - connects the third low-pass filter to the second adder when the yaw-stabilizing command and the electrical control command are of the same sign.

Preferably, the first, second and third low-pass filters are of the first-order type, with a transfer function of the form $$\frac{1}{1+\tau p},$$

$\tau$ being the respective time constant $\tau 1$, $\tau 2$ or $\tau 3$ of the first, second and third filters and p being the LAPLACE variable.

The first ($\tau 1$), second ($\tau 2$) and third ($\tau 3$) time constants may have respective values of between 100 ms and 500 ms; 500 ms and 1 second; and 1 second and 2 seconds.

Furthermore, the limit may correspond to roughly 70% of the maximum value of travel of the rudder.

BRIEF DESCRIPTION OF THE DRAWINGS

The figures of the appended drawings will make it easy to understand how the invention may be embodied. In these figures, identical references denote elements which are similar.

FIG. 1 shows the block diagram of one embodiment of the electrical fly-by-wire operating system according to the present invention;

FIG. 2 is a diagram illustrating, in a plan view, the movements of the aircraft rudder operated by the system of FIG. 1.

DETAILED DESCRIPTION OF THE INVENTION

Figure 3:
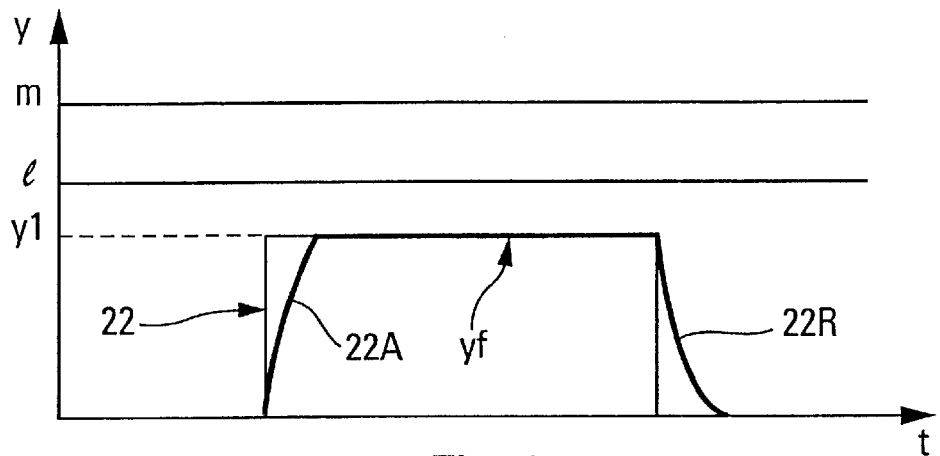
FIGS. 3, 4 and 5 illustrate the filtering of the operating commands for the rudder, for three different command amplitudes, respectively.

The electrical fly-by-wire operating system according to the present invention and depicted in FIG. 1 is intended to operate an aircraft rudder 1 mounted to rotate in both directions about an axis Z—Z in the way symbolized by the double headed arrow 2. As illustrated in the schematic plan view of FIG. 2, the rudder 1 can adopt any angular position whatsoever about axis Z—Z, within a range of travel 3 extending on each side of the aerodynamically neutral position 4 of rudder 1. The range of travel 3 is limited on each side of the neutral position 4 by a position 5D or 5G, corresponding to the maximum travel value M (to the right and to the left respectively) and embodied by end stops 6 for rudder 1.

The electrical fly-by-wire operating system comprises a rudder bar 7 available to the pilot (not depicted), associated with a transducer 8 delivering an electrical yaw-control command y, and an actuator 9 receiving, from the output of an adder 10, an operating command c capable of moving rudder 1 about axis Z—Z.

The electrical fly-by-wire operating system of FIG. 1 additionally comprises yaw-stabilizing means 11 (flight computer), generating a yaw-stabilizing command s sent to one of the inputs of adder 10. The other input of adder 10 receives a command yf, corresponding to yaw-control command y after filtering via an arrangement 12 arranged between transducer 8 and adder 10.

The operating command c for actuator 9 is therefore the sum of the filtered command yf and of the yaw-stabilizing command s.

The filtering arrangement 12 comprises a limiter 13 receiving, at its input 13E, the yaw-control command y and capable of limiting it in amplitude to a limit value l corresponding to a predetermined fraction L of the maximum travel value M. For example, the limit L is equal to 70% of the maximum value M (see FIG. 2). The limiter 13 operates as follows:

if the amplitude y1 of the control command y is less than the limit value l, it is signal y which appears at the output 13S of limiter 13;

by contrast, if the amplitude y2 of the control command y is greater than the limit value l, it is this limit value l which is present at output 13S.

Filtering arrangement 12 additionally comprises three first-order low-pass filters 14, 15 and 16, a subtractor 17, an adder 18, a controlled switch 19, an operating device 20 for the switch, and a multiplier 21.

These various elements are connected as follows:

input 14E and output 14S of the filter 14 are connected respectively to output 13S of limiter 13 and to one of the inputs 18E1 of adder 18;

the positive input 17P and the negative input 17N of subtractor 17 are connected respectively to the output of transducer 8 and to output 13S of limiter 13, so that subtractor 17 at its output 17S delivers the difference between the electrical yaw-control command y and this same command limited by limiter 13;

inputs 15E and 16E of filters 15 and 16 are connected in common to output 17S of subtractor 17;

outputs 15S and 16S of filters 15 and 16 are connected respectively to the two inputs 19E1 and 19E2 of the controlled switch 19;

output 19S of the controlled switch 19 is connected to the other input 18E2 of adder 18, so that the latter receives either the signal filtered by filter 15 or the signal filtered by filter 16, depending on the position of switch 19;

the control device 20 operating switch 19 is itself controlled by multiplier 21, which receives both the yaw-stabilizing command s and the yaw-control command y.

The way in which the system, according to the invention, works is described hereinafter with reference to the diagrams of FIGS. 3, 4 and 5, which represent the yaw-control command y as a function of time t. The diagrams also show the limit values l and m corresponding respectively to the limit angular values L and M.

FIG. 3 depicts the scenario in which the given command y is in the form of a square pulse 22, the amplitude yl of which is below the limit l. In this case, the limiter 13 allows the square pulse 22 to pass in its entirety, and this appears at its output 13S. Thereafter:

subtractor 17 receives the same square pulse 22 on its two inputs 17P and 17N, which means that no signal is present on its output 17S and neither of filters 15 and 16 is active;

filter 14 receives the square pulse 22 and filters it, rounding off the sharp rising 22A and falling 22R edges, in the way depicted in FIG. 3.

The signal yf in this case therefore consists entirely of this square pulse with rounded rising and falling edges 22A and 22R.

If, now, the given command y is in the form of a square pulse 23, the amplitude y2 of which is above the limit value l (see FIGS. 4 and 5), the limiter 13 is active and at its output 13S delivers a square pulse corresponding to the square pulse 23, but limited to the amplitude l. Thereafter:

filter 14 receives the square pulse 23, capped of its excess 24 above the amplitude l; and subtractor 17 delivers on its output 17S the excess 24 above the amplitude l, sent to the inputs 15E and 16E of the filters 15 and 16.

The square pulse 23, capped of the excess 24, is filtered by filter 14 in the way similar to the one indicated above for the square pulse 22 (note the rising and falling edges 23A and 23R).

In addition, excess 24 is filtered either by the filter 15 or by filter 16, depending on the signs of the commands y and s.

Figure 4:
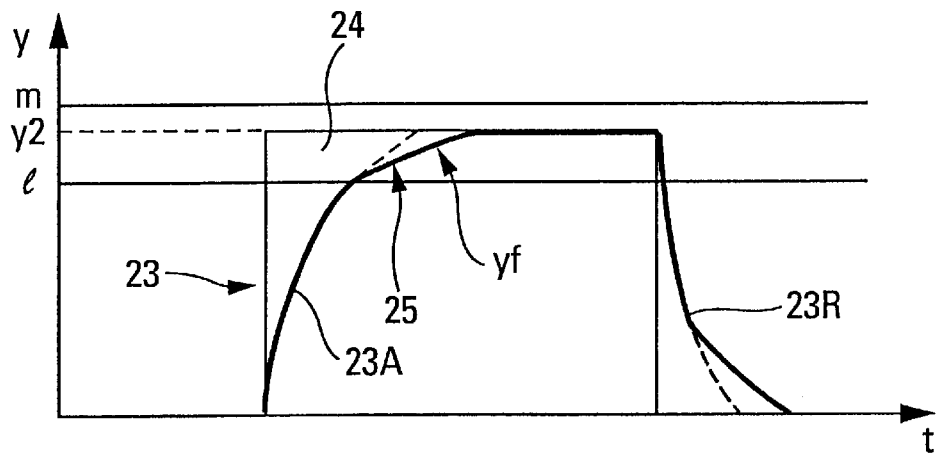

If these signs are opposite, something which is detected by multiplier 21, the switch 19, controlled by device 20, connects the output 15S of filter 15 to the input 18E2 of adder 18, so that this excess 24 is filtered by filter 15, more strongly than filter 14 filters the capped square pulse 23, as indicated by the curved segment 25 in FIG. 4. This figure also represents, in dashed line, by way of comparison, the continuation of the rounded rising edge 23A that would have resulted from filtering by filter 14.

By contrast, if the commands y and s are of the same sign, the device 20, under the control of multiplier 21, switches switch 19 so that the output 16S of filter 16 is now connected to the input 18E2 of adder 18. The excess 24 is therefore more strongly filtered by filter 16 than by filter 15, as shown by the curved segment 26 in FIG. 5. In this last figure, a dashed line has been used, for comparison purposes, to depict the continuations of the rounded rising edge 23A which would have resulted from filtering by filters 14 and 15 respectively.

Figure 5:
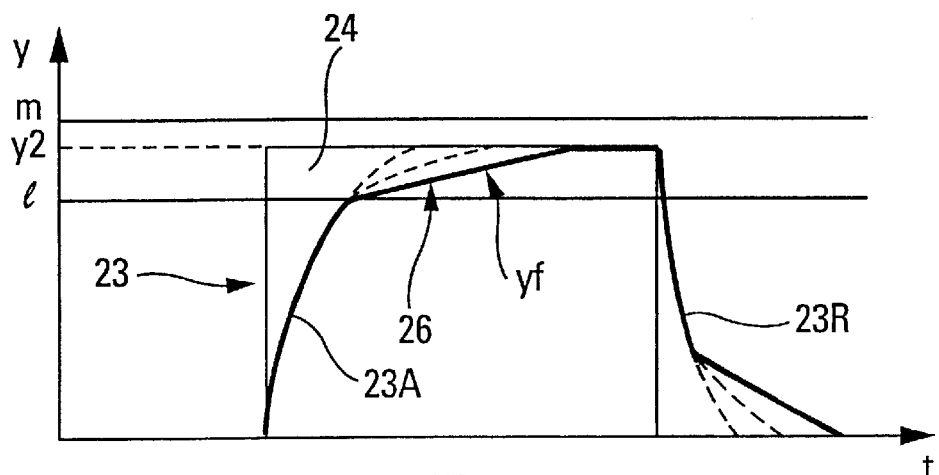

In both instances of FIGS. 4 and 5, the filtered command yf therefore consists of the sum of the capped square pulse 23, filtered by filter 14, and of the excess 24, filtered either by filter 15 or by filter 16 (FIG. 4 or FIG. 5).

The low-pass filters 14, 15 and 16 have time constants which, for example, are respectively between 100 ms and 500 ms; 500 ms and 1 second; and 1 second and 2 seconds. Thus:

the filtering afforded by filter 14 corresponds to high flyability criteria;

filter 15 allows a significant reduction in the loadings applied to the rudder, when the action on the rudder bar and the action of the yaw stabilizer oppose one another; and filter 16 allows a significant reduction in the loadings even when the action of the rudder bar and the action of the yaw stabilizer combine.

Such a reduction in the loadings applied to the rudder allows its size and therefore mass to be reduced.

What is claimed is:

1. An electrical fly-by-wire system for operating a rudder of an aircraft, said rudder being mounted so that it can rotate about an axis so that it can adopt any angular position whatsoever within a range of travel extending on each side of the neutral position of the rudder and limited on each side of this neutral position by a maximum travel value, said system comprising:

a rudder bar, for actuation by a pilot, associated with a transducer that delivers an electrical control command that represents an action of the pilot on said rudder bar;

an actuator receiving an operating command derived from said control command and moving said rudder about said axis; and a filtering means of a low pass type, between said rudder bar and said actuator, for receiving said control command from said transducer and generating said operating command for said actuator, wherein the higher a fraction of said maximum travel value to which an amplitude of said control command corresponds, the higher a time constant of said filtering means.

2. The system as claimed in claim 1, further comprising:

a stabilizion means for stabilizing said aircraft in terms of yaw by generating a yaw-stabilizing command;

a first adder that sums said yaw-stabilizing command and said actuator operating command; and a determination means for determining whether said control command and said yaw-stabilizing command are of the same sign or of opposite signs, wherein said determination means act on said filtering means to increase their time constant when said control command and said stabilizing command are of the same sign.

3. The operating system as claimed in claim 1, further comprising:

a limiter that receives said control command and delivers an output signal which is:

either said control command, when the amplitude thereof corresponds to a travel value below a limit equal to a predetermined fraction of said maximum travel value; or a limit value corresponding to said limit when the amplitude of said control command is greater than said limit value;

a first low-pass filter, having a first time constant, that receives said output signal from said limiter and outputs a first output signal;

a subtractor that calculates the difference between said control command and said output signal from said limiter;

a second low-pass filter, having a second time constant higher than said first time constant, that receives said difference calculated by said subtractor and outputs a second output signal; and a second adder that sums the first and second output signals from said first and second filters, so as to generate a filtered control command for said actuator.

4. The system as claimed in claim 3, wherein said first low-pass filter is of a first-order type.

5. The system as claimed in claim 3, wherein said first time constant of said first low-pass filter is between 100 ms and 500 ms.

6. The system as claimed in claim 3, wherein said second low-pass filter is of a first-order type.

7. The system as claimed in claim 3, wherein said second time constant of said second low-pass filter is between 500 ms and 1 second.

8. The system as claimed in claim 3, wherein said limit is equal to approximately 70% of said maximum travel value.

9. The system as claimed in claim 3, further comprising:

a third low-pass filter, having a third time constant higher than said second time constant, that receives said difference calculated by said subtractor and outputs a third output signal;

a controlled switch inserted between said second adder and said second and third low-pass filters, so as to be able to send to said second adder either the second output signal from said second low-pass filter or the third output signal from said third low-pass filter; and a control means for controlling said switch such that the switch:

connects said second low-pass filter to said second adder when said yaw-stabilizing command and said electrical control command are of opposite signs; and connects said third low-pass filter to said second adder when said yaw-stabilizing command and said electrical control command are of the same sign.

10. The system as claimed in claim 9, wherein said third low-pass filter is of a first-order type.

11. The system as claimed in claim 9, wherein said third time constant of said third low-pass filter is between 1 second and 2 seconds.

* * * * *